(12) United States Patent
Eryilmaz et al.

(10) Patent No.: US 11,913,388 B2
(45) Date of Patent: Feb. 27, 2024

(54) CABIN BLOWER SYSTEM

(71) Applicant: ROLLS-ROYCE plc, London (GB)

(72) Inventors: Ibrahim Eryilmaz, Bedford (GB); Vasileios Pachidis, Milton Keynes (GB)

(73) Assignee: ROLLS-ROYCE plc, London (GB)

( * ) Notice: Subject to any disclaimer, the term of this patent is extended or adjusted under 35 U.S.C. 154(b) by 100 days.

(21) Appl. No.: 17/712,924

(22) Filed: Apr. 4, 2022

(65) Prior Publication Data

US 2022/0355939 A1 Nov. 10, 2022

(30) Foreign Application Priority Data

May 5, 2021 (GR) ............................. 20210100298
Jun. 29, 2021 (GB) ................................... 2109322

(51) Int. Cl.

| | |
|---|---|
| *F02C 9/18* | (2006.01) |
| *F02C 7/32* | (2006.01) |
| *F01D 25/36* | (2006.01) |
| *B64D 13/06* | (2006.01) |
| *B64D 27/02* | (2006.01) |

(Continued)

(52) U.S. Cl.
CPC ............... *F02C 9/18* (2013.01); *F01D 25/36* (2013.01); *F02C 7/32* (2013.01); *B64D 2013/0644* (2013.01); *B64D 2027/026* (2013.01); *F01D 15/10* (2013.01); *F01D 21/12* (2013.01);

(Continued)

(58) Field of Classification Search
None
See application file for complete search history.

(56) References Cited

U.S. PATENT DOCUMENTS

| | | |
|---|---|---|
| 2017/0191419 A1 | 7/2017 | Bayraktar et al. |
| 2017/0356457 A1 | 12/2017 | Rasmussen |

(Continued)

FOREIGN PATENT DOCUMENTS

| | | |
|---|---|---|
| EP | 3 187 684 A1 | 7/2017 |
| EP | 3 263 845 A1 | 1/2018 |

(Continued)

OTHER PUBLICATIONS

Sep. 22, 2022 Extended Search Report issued in European Patent Application No. 22165755.4.

(Continued)

*Primary Examiner* — Gerald L Sung
*Assistant Examiner* — Alyson Joan Harrington
(74) *Attorney, Agent, or Firm* — Oliff PLC

(57) ABSTRACT

A cabin blower for an aircraft, the system comprising: a cabin blower compressor; an electric machine; and a controller configured to control the cabin blower system so that: in a cabin blower mode of operation, the cabin blower compressor is driven by power extracted from one or more spools of a gas turbine engine of the aircraft and provides a flow of air to a cabin of the aircraft. The controller may be further configured to control the system so that: in a rotor bow mitigation mode of operation, the cabin blower compressor is driven by the electric machine using electrical power from an electrical power source and provides a flow of air through a core of the gas turbine engine to remove heat from the core. A method of operating a cabin blower system of an aircraft is also provided.

19 Claims, 10 Drawing Sheets

(51) Int. Cl.
  *F01D 25/34* (2006.01)
  *F01D 15/10* (2006.01)
  *F01D 21/14* (2006.01)
  *F01D 21/12* (2006.01)
(52) U.S. Cl.
  CPC .............. *F01D 21/14* (2013.01); *F01D 25/34* (2013.01); *F05D 2220/76* (2013.01); *F05D 2260/42* (2013.01)

(56) References Cited

U.S. PATENT DOCUMENTS

| | | | | |
|---|---|---|---|---|
| 2017/0370242 | A1* | 12/2017 | Bacic | ..................... B64D 13/08 |
| 2019/0233124 | A1* | 8/2019 | Sharpe | .................. F04D 13/021 |
| 2019/0360401 | A1 | 11/2019 | Rambo et al. | |
| 2022/0235707 | A1* | 7/2022 | Millhaem | ............... F01D 25/12 |

FOREIGN PATENT DOCUMENTS

| | | |
|---|---|---|
| EP | 3 517 436 A1 | 7/2019 |
| GB | 2 560 011 A | 8/2018 |

OTHER PUBLICATIONS

Dec. 13, 2021 Combined Search and Examiantion Report issued in British Patent Application No. 2109322.4.

\* cited by examiner

CABIN BLOWER SYSTEM

CROSS-REFERENCE TO RELATED APPLICATIONS

This specification is based upon and claims the benefit of priority from Greek Patent Application No. 20210100298, filed on 5 May 2021, and United Kingdom Patent Application No. 2109322.4, filed on 29 Jun. 2021. The entire contents of both applications are incorporated herein by reference.

TECHNICAL FIELD

This disclosure concerns cabin blower systems for aircraft, particularly but not exclusively cabin blower systems with rotor bow mitigation functionality.

BACKGROUND

Gas turbine engines power a variety of platforms, including aircraft. It is desirable to reduce fuel consumption and emissions, as well as maintenance costs and requirements, of gas turbine engines.

Rotor bow in gas turbine engines is one known problem. It occurs because hot air within the engine core rises due to buoyancy. During normal operation the constant rotation of the engine spools and the airflow through the core prevents the establishment of thermal asymmetry. After engine shutdown, however, the spools no longer rotate and so thermal asymmetry develops and causes the engine shafts, drums and casings to bow due to differing rates of thermal contraction.

Rotor bow will potentially be a greater problem in the next generation of gas turbine engines, which are expected to have relatively longer, thinner cores which may be more susceptible to bowing. Such engines may also include reduction gearboxes driving the fans of the LP spool, and these gearboxes may further contribute to bowing due to the presence of additional weight towards the front of the engine.

FIG. 1A illustrates thermal asymmetry within the annular gas path of an engine core, with the higher temperature air rising and the cooler air sinking. As illustrated in FIG. 1B, the residual heat will dissipate if the engine is left long enough in the shutdown state, in which case the components will return to their normal shapes. Waiting for this is, however, economically problematic because it increases the turnaround time between flights of the aircraft. Conversely, re-starting the engine whilst components are bowed may cause engine damage or wear due to rubbing at seals and rotor blade tips, for example.

A number of methods have been proposed for mitigating thermal rotor bow. These generally fall into one of the following categories:
  (i) Extended idle: This is where the engine is run at low power for a period of time prior to shutdown, in order to allow the high thermal capacity rotating parts to cool down before the engine is shut down.
  (ii) Barring: This is the continuous cranking of the engine rotors by one or more electric machines after shutdown, to prevent the formation of thermal asymmetry. Such an approach is described in European Patent Publication EP 3392465 B1.
  (iii) Pre-Start Crank: This is the cranking of the engine rotors by one or more electric machines prior to start, in order to eliminate the thermal gradient and avoid rubs and wear upon engine start.
  (iv) Ventilation: This is the use of external airflow generators at the airport to cool the engine by forced convection after engine shutdown/prior to engine starting.

The use of extended idle is an attractively simple approach, but involves burning additional fuel and contributes to pollution around airports. Known implementations of barring, pre-start crank and ventilation may be functionally adequate, but may require the provision of dedicated equipment in the engine or at airports. It would be desirable to provide alternative ways of mitigating rotor bow.

SUMMARY

According to a first aspect, there is provided a cabin blower system for an aircraft. The system comprises: a cabin blower compressor; an electric machine; an energy storage system; and a controller. The controller is configured to control the cabin blower system so that: in a cabin blower mode of operation, the cabin blower compressor is driven by power extracted from one or more spools of a gas turbine engine of the aircraft and provides a flow of air to a cabin of the aircraft.

The following optional features may be used singularly or in combination with each other.

The controller may be further configured to control the system so that: in a rotor bow mitigation mode of operation, the cabin blower compressor is driven by the electric machine using electrical power from an electrical power source and provides a flow of air through a core of the gas turbine engine to remove heat from the core. Incorporating rotor bow mitigation functionality into an aircraft cabin blower system may advantageously reduce or even avoid the need for additional hardware, which reduces aircraft weight and thus engine fuel consumption. Furthermore, it avoids the need for dedicated ventilation equipment to be provided at airports.

The controller may be configured to automatically invoke the rotor bow mitigation mode of operation in response to determining that the engine has been shut down, for example following landing and taxiing. The mode may be invoked immediately after engine shutdown, or at a later time, for example prior to engine start after a period of inactivity. In other embodiments the mode of operation may be manually invoked, for example by an aircraft pilot.

The cabin blower compressor may be in fluid communication with a gas path of the gas turbine engine. In the cabin blower mode of operation, air is received by the blower compressor, compressed and provided to the cabin, possibly via an environmental control (e.g., air conditioning) unit. In the rotor bow mitigation mode of operation, in which there is little or no incident airflow through the engine, the cabin blower compressor is able to 'suck' air through the gas path to displace hot air and speed up to cooling of the engine core. The hot air sucked through the gas path by the compressor may be provided to an environmental conditioning unit or otherwise vented. In other embodiments the cabin blower compressor may 'blow' air through the engine, for example by driving the compressor in a reverse direction of rotation in the rotor bow mitigation mode of operation.

In the rotor bow mitigation mode of operation, the electric machine and/or an additional electric machine of system may drive rotation of one or more spools of the gas turbine engine using electrical power from the electrical power source. Cranking the spool(s) in this way helps prevent the establishment of thermal gradients in the first place, which reduces the onset of rotor bow and potentially the time between flights. In some embodiments both a high-pressure spool and a low-pressure spool (or high-pressure spool and intermediate-pressure spool) are driven to rotate in the rotor bow mitigation mode of operation.

The electric machine and/or the additional electric machine may drive the rotation of the one or more spools at a speed of less than 1,500 rpm. The speed may be less than 1,000 rpm. The speed may even be less than 500 rpm, or even less than 100 rpm. In other words, in the rotor bow mitigation mode of operation, the spool(s) may be driven substantially slower than they rotate during flight of the aircraft. However, in these embodiments the speed of rotation may be higher than 50 rpm or even higher than 100 rpm, as rotating the spools higher than only a few rpm promotes an air flow which may further reduce problems with rotor bow.

The sucking/blowing of air through the gas path and/or the driving of the rotation of one or more spools of the engine in the rotor bow mitigation mode may be continuous or pulsed. In some embodiments, the rotor bow mitigation operation may initially be continuous (e.g., for an initial period of time) after which it may be pulsed. By "pulsed operation", it is meant that the electric machine(s) which drive the cabin blower compressor and/or the spool(s) are powered for a short period of time, after which they are allowed to slow down before a subsequent pulse (e.g., a number of minutes, for example 4-5 minutes, later). Such an approach may offer improvements in terms of power usage and power electronics operability.

The controller may be further configured to control the system so that: in a hybrid flight mode of operation, the cabin blower compressor is driven by the electric machine using electrical power from the electrical power source and provides a flow of air to a cabin of the aircraft. This effectively electrifies the cabin blower mode of operation and may be of particular benefit during stages of the flight where the required thrust is low, for example during descent. This may reduce engine fuel consumption. Thus, the controller may be configured to operate the system in the hybrid flight mode of operation in response to making a determination to the effect that the aircraft is descending.

The hybrid flight mode may also be useful where the cabin blower power demand is low, for example during take-off, particularly on a hot day. In this case the reduction in shaft power off-take may, for example, increase turbine life. Thus, the controller may be configured to operate the system in the hybrid flight mode of operation in response to making a determination to the effect that the aircraft is taking off and/or a power requirement of the cabin blower system is below a threshold level. In either case, a further determination may be made as to whether the state of charge of the energy storage system is above a threshold level prior to engaging the hybrid flight mode.

In other embodiments the mode of operation may be manually invoked, for example by an aircraft pilot.

The electrical power source may be an onboard electrical power source, for example an energy storage system (e.g., a battery) or an electrical generator (e.g., a generator driven by an auxiliary power unit (APU) of the aircraft). In other embodiments, the onboard electrical power source may be replaced or supplemented by an external electrical power source, for example ground equipment.

Where the electrical power source comprises an energy storage system, the controller may be further configured to control the system so that: in a charging mode of operation, the energy storage system is charged using electrical power generated by the electric machine and/or an additional electric machine using mechanical power extracted from one or more spools of the gas turbine engine. The rotor bow mitigation mode of operation requires that the energy storage system has charge, but this may not be the case if, for example, the energy storage system has been discharged during the hybrid descent described above. Thus, the charging mode of operation may be of particular benefit after descent, for example during landing (e.g., during reverse thrust where excess power can be removed from the engine spools) or taxiing. Thus, the controller may be configured to operate the system in the charging mode of operation in response to making a determination to the effect that the aircraft is landing, for example during reverse thrust, or is taxiing. In other embodiments the mode of operation may be manually invoked, for example by an aircraft pilot.

The cabin blower compressor may be arranged to receive mechanical power from one or more spools of the gas turbine engine whereby, in the cabin blower mode of operation, the cabin blower compressor is at least partially driven by mechanical power from the gas turbine engine. The cabin blower compressor may be selectively connectable to the mechanical power from the gas turbine engine spool(s), for example via a mechanical or electromechanical disconnect arrangement (e.g., a clutch).

The system may further comprise a generator arranged to receive mechanical power from one or more spools of the gas turbine engine and to generate electrical power therefrom. In the cabin blower mode of operation, the cabin blower compressor may be driven by the electric machine and/or additional electric machine using electrical power generated by the generator. Thus, an even more electric cabin blower system may be provided, which may reduce the weight and mechanical complexity of the system.

The system may further comprise a transmission having an output arranged to drive the cabin blower compressor and at least one transmission input. The at least one transmission input may be arranged to receive a mechanical output from the electric machine.

The system may comprise: a transmission having an output arranged to drive the cabin blower compressor; a first transmission input from a spool of the gas turbine engine; and a second transmission input from the electric machine. In the cabin blower mode of operation, the transmission may receive mechanical power from the gas turbine engine via the first transmission input and drive the cabin blower compressor via the transmission output. In the rotor bow mitigation mode of operation, the transmission may receive mechanical power from the electric machine via the second transmission input and drive the cabin blower compressor via the transmission output. In the cabin blower mode of operation, the transmission may be operable to receive mechanical power from both (i) the gas turbine engine via the first transmission input, and (ii) the electric machine via the second transmission input.

A direction of rotation of the electric machine and thereby the direction of rotation of the second transmission input may be reversible. A speed of rotation of the transmission output may be a function of both (i) a speed of the first transmission input, and (ii) a speed and direction of rotation of the second transmission input. When the electric machine and the second transmission input rotate in a forward direction of rotation, the second transmission input may add to the speed of the transmission output. When the electric machine and the second transmission input rotate in a reverse direction of rotation, the second transmission input may subtract from the speed of the transmission output.

The electric machine may be a first electric machine and the system may further comprise: a second electric machine arranged to receive mechanical power from the one or more spools of the gas turbine engine; and a power management system electrically connected to the first electric machine and the second electric machine. This may permit transfer of electrical power between the two electric machines and to other electrical loads. The machines may be operable in motor-motor mode, motor-generator/generator-motor mode, or generator-generator mode.

The electrical power source may be electrically connected to the power management system, whereby the first electric machine and/or second electric machine can receive power electric from the electrical power source via the power management system. In any embodiment herein, the electrical power source may comprise an energy storage system, which may be a battery, supercapacitor or combined battery-supercapacitor system capable or being selectively charged using electrical power generated by one or more of the electric machines, and discharged as required.

According to a second aspect, the controller of the first aspect is provided separately.

According to a third aspect, there is provided a gas turbine engine comprising the cabin blower system of the first aspect. The gas turbine engine may have any suitable general architecture. For example, the gas turbine engine may have any desired number of shafts that connect turbines and compressors, for example one, two or three shafts.

The gas turbine engine may comprise: an engine core comprising a turbine, a compressor, and a core shaft connecting the turbine to the compressor; and a fan located upstream of the engine core.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The gas turbine engine may comprise a gearbox that receives an input from the core shaft and outputs drive to the fan so as to drive the fan at a lower rotational speed than the core shaft.

According to a fourth aspect, there is provided an aircraft comprising the cabin blower system of the first aspect, or a gas turbine engine of the third aspect.

According to a fifth aspect, there is provided a method of operating a cabin blower system of an aircraft. The method comprises: during flight of the aircraft, using power extracted from one or more spools of a gas turbine engine of the aircraft, driving a cabin blower compressor to provide a flow of air to a cabin of the aircraft.

The method may further comprise: after shutting down the engine, using an electric machine powered by electrical power from an electrical power source, driving the cabin blower compressor to provide a flow of air through a core of the gas turbine engine to remove heat from the core.

The method may further comprise: after shutting down the engine, using the electric machine and/or an additional electric machine powered by electrical power from the electrical power source, driving rotation of one or more spools of the gas turbine engine.

The electric machine and/or the additional electric machine may drive the rotation of the one or more spool at a speed of less than 1,500 rpm, less than 1,000 rpm, or even less than 500 rpm.

The method may further comprise: during a descent phase of the flight of the aircraft, using the electric machine powered by electrical power from the electrical power source, driving the cabin blower compressor to provide a flow of air to a cabin of the aircraft.

Where the electrical power source comprises an energy storage system, the method may further comprise, during a landing phase of the flight of the aircraft: extracting, by the electric machine and/or an additional electric machine, mechanical power from a spool of the gas turbine engine and generating electrical power therefrom; and charging the energy storage system using the generated electrical power.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 2A

Figure 1A:
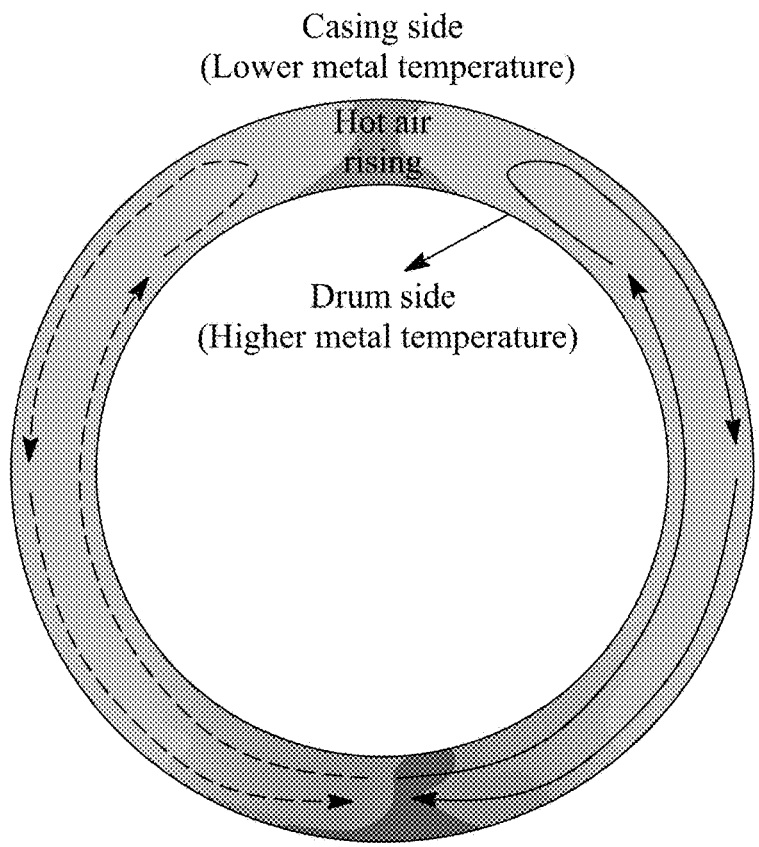
FIG. 1A shows an annulus of a core of a gas turbine engine and illustrates thermal asymmetry following engine shutdown.
Figure 1B:
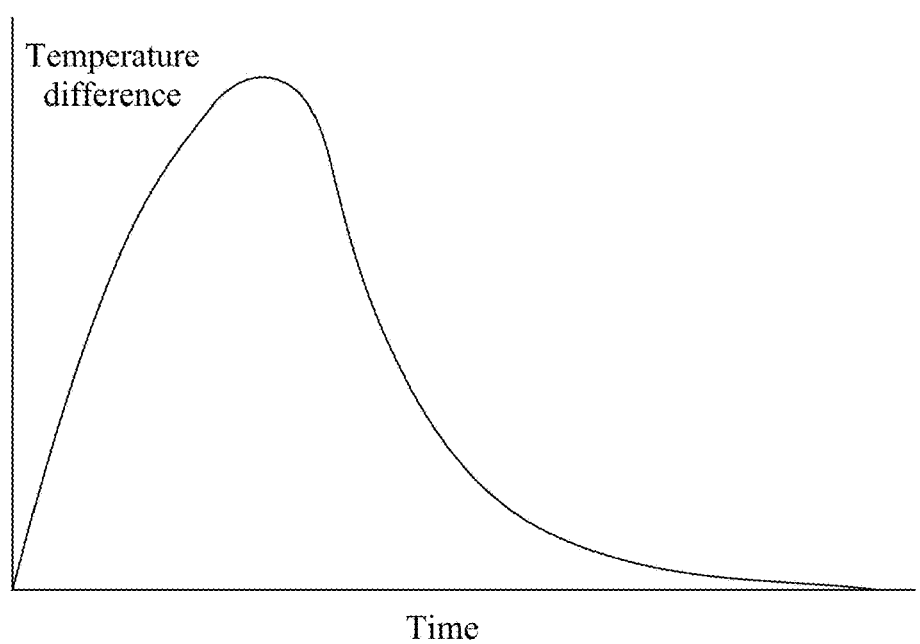
FIG. 1B is a graph illustrating how the temperature difference between the top and bottom of an engine core varies following engine shutdown.
Figure 2A:
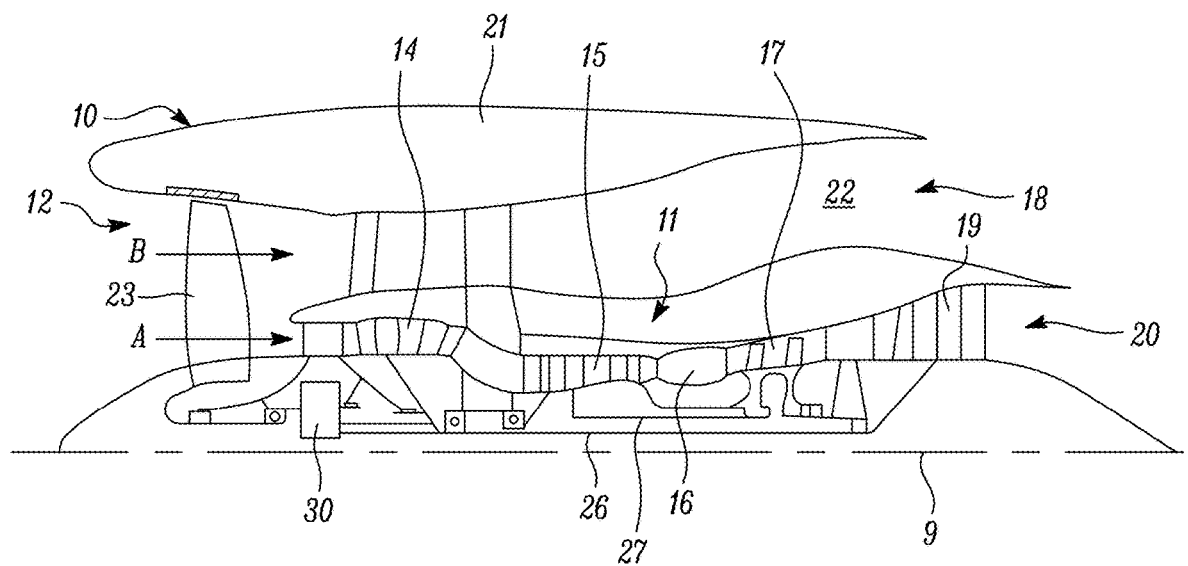
FIG. 2A is a sectional side view of a gas turbine engine.

FIG. 2A illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

FIG. 2B

Figure 2B:
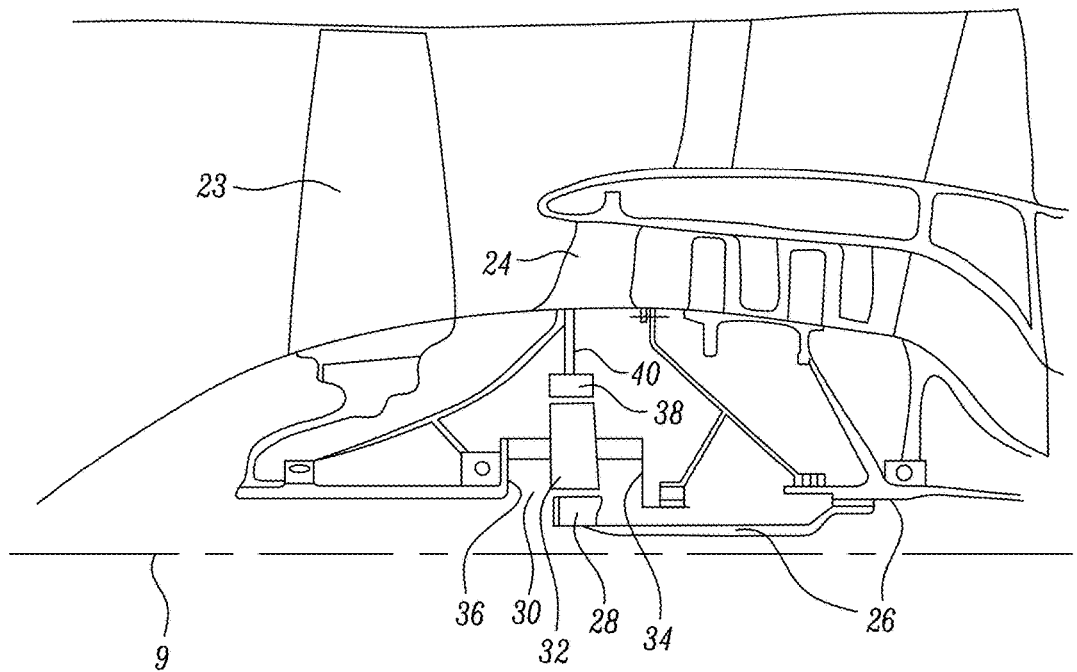
FIG. 2B is a close-up sectional side up view of an upstream portion of a gas turbine engine.

An exemplary arrangement for a geared fan gas turbine engine 10 is shown in FIG. 2B. The low pressure turbine 19 (see FIG. 2A) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3

Figure 3:
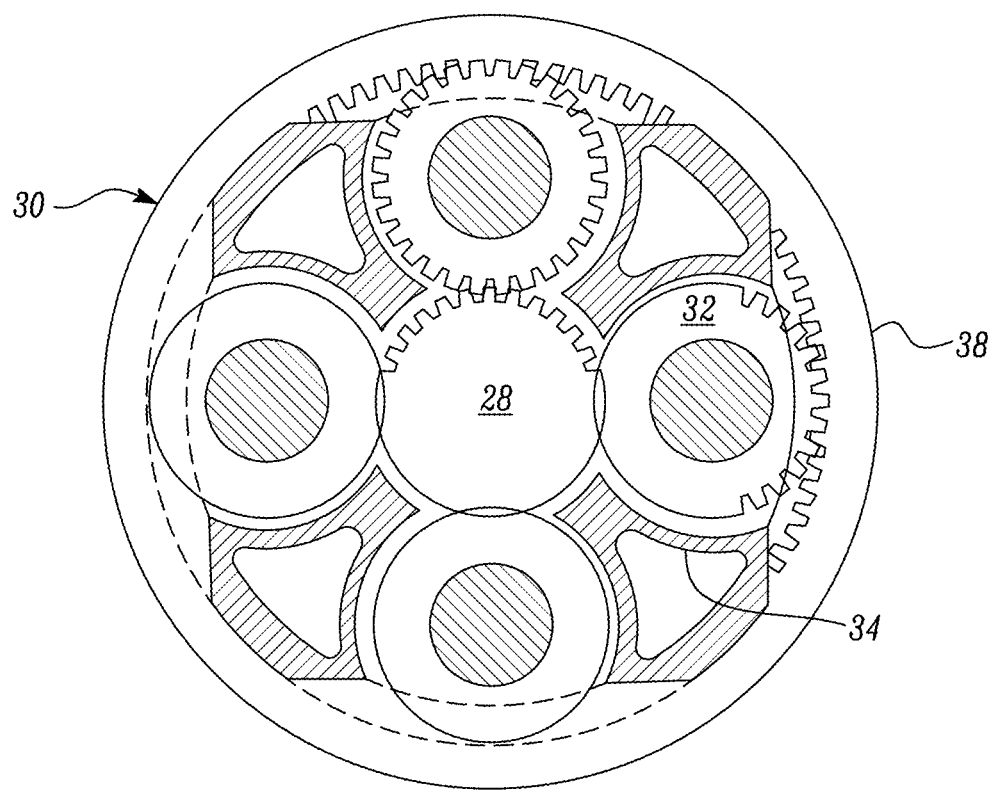
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2A-B and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2A-B and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2B example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2B. For example, where the gearbox 30 has a star arrangement (described above), the skilled person would readily understand that the arrangement of output and support linkages and bearing locations would typically be different to that shown by way of example in FIG. 2B.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2A has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2A), and a circumferential direction (perpendicular to the page in the FIG. 2A view). The axial, radial and circumferential directions are mutually perpendicular.

FIG. 4

Figure 4:
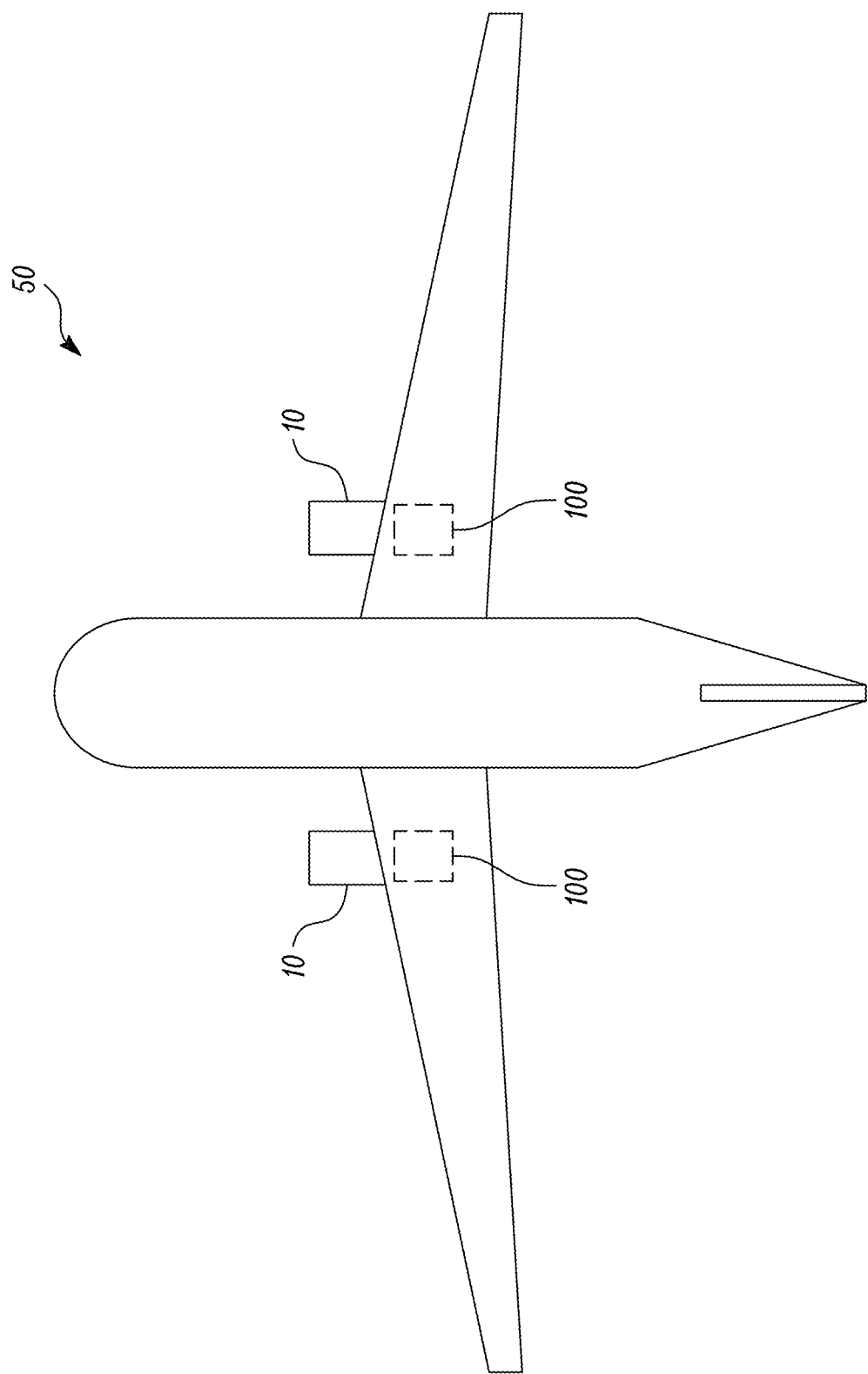
FIG. 4 is a schematic illustration of an aircraft including two gas turbine engines and associated cabin blower systems.

FIG. 4 illustrates an aircraft 50 including two gas turbine engines 10 and two associated cabin blower systems 100.

FIG. 5

Figure 5:
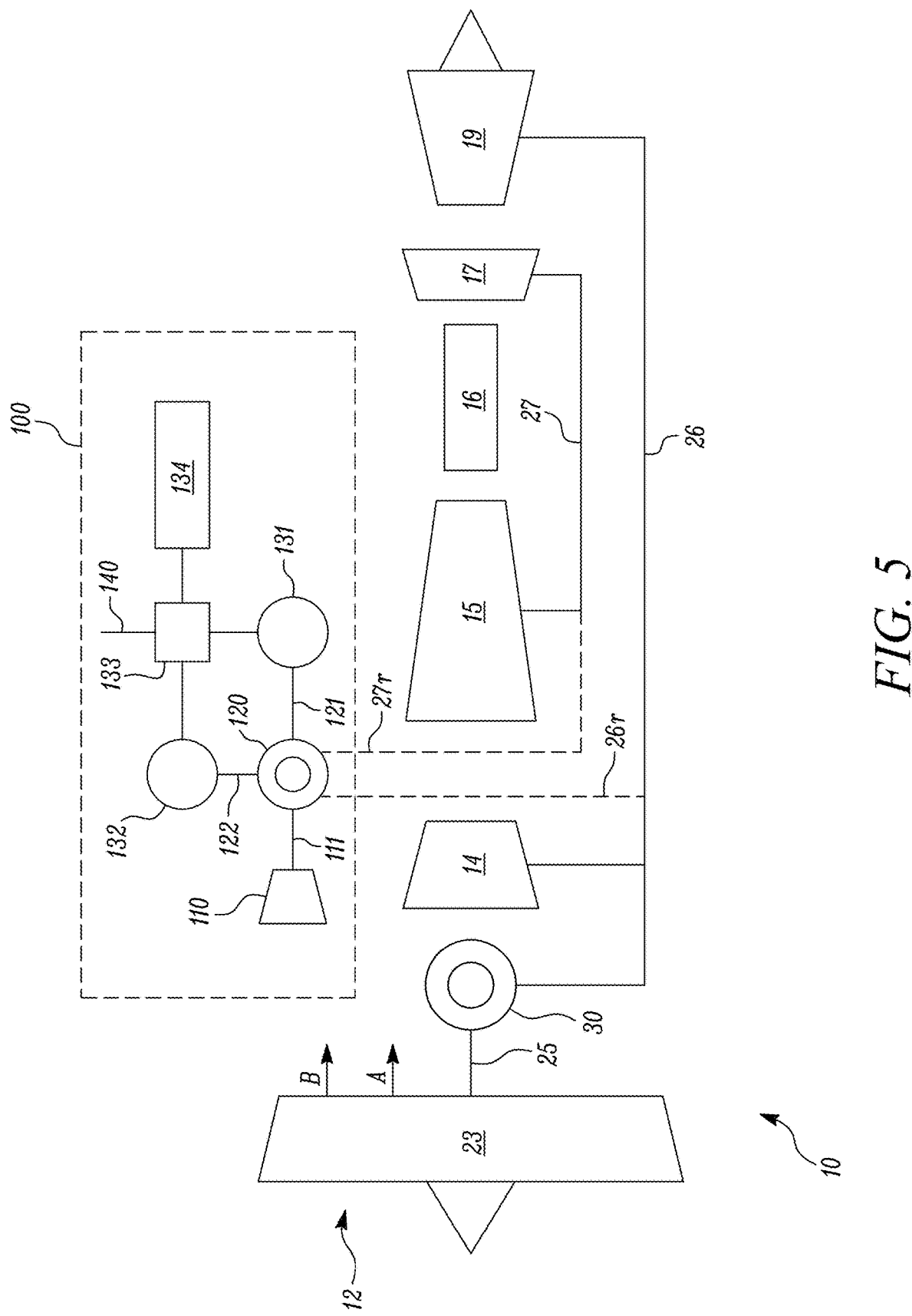
FIG. 5 is a schematic diagram of a gas turbine engine including or interfacing with a cabin blower system.

FIG. 5 illustrates, in schematic form, a geared turbofan engine 10 which includes or interfaces with a cabin blower system 100. It should be appreciated that although a geared engine 10 is illustrated, the system 100 could also be included in or interface with a non-geared engine.

The cabin blower system 100 includes a cabin blower compressor 110 which is arranged within the aircraft 50 (e.g., within the engine 10) to receive and compress air. The compressed air can then be delivered to the cabin of the aircraft 50, generally via an environmental conditioning unit which may, for example, condition the temperature and humidity of the air. The source of the air received by the compressor 110 is discussed in more detail below, but will generally be some form of air offtake from the engine 10 or aircraft 50, which is delivered to the compressor 110 through a manifold/pipework.

In the illustrated embodiment the cabin blower compressor 110, which may have variable geometry (e.g., variable inlet and/or outlet vanes), is driven by a transmission 120 via a connecting output shaft 111. The transmission 120 is preferably a continuously variable transmission (CVT), for example a differential gearbox or summing epicyclic gearbox, so that the cabin blower compressor 110 can be driven to rotate over a continuous range of speeds.

The transmission 120 is arranged in mechanical communication with one or more spools of the gas turbine engine 10, in this case via off-take shafts 26r, 27r. In the illustrated embodiment the transmission 120 can selectively receive inputs from the low pressure radial shaft 26r and the high pressure radial shaft 27r, which are bevelled to the low pressure shaft 26 and the high pressure shaft 27 respectively, though other arrangements are possible and will occur to those skilled in the art.

The transmission 120 is also arranged in mechanical communication with an electric variator which includes a first electric machine 131 and a second electric machine 132 connected with the transmission via transmission auxiliary input shafts 121, 122. Each of the first and second electric machines 131, 132 operates independently of the other, as either a motor or a generator depending on the mode of operation, under the control of the power management system 133. In this way, each of the first and second electric machines 131, 132 can either drive the transmission 120, or can be driven by the transmission 120 to generate electrical power from the mechanical power received from the engine shaft(s) 26, 27.

The power management system 133, as well as controlling the mode of operation of the electric machines 131, 132, allows for the transfer of electrical power between the two electric machines 131, 132. For instance, one machine can operate as a generator and the other as a motor, and electrical power can be transferred from the generator to the motor via the power management system 133. Electrical power may also be transferred to one or more other electrical loads about the engine 10 and/or aircraft 50, illustrated in FIG. 5 by the electrical output 140.

The system also includes an energy storage system 134, which can take any suitable form including a battery, a capacitor (e.g., a supercapacitor) or a combination of the two. The energy storage system 134 may discharge to one or both the electric machines 131, 132 as required and, if necessary, to other electrical loads via the output 140. Although not illustrated, it is envisaged that the energy storage system 134 could be replaced or supplemented by an external source of electrical power, for example a ground cart at an airport, for some modes of operation.

During normal flight of the aircraft 50, for example after take-off or during cruise, the system 100 will typically operate in a cabin blower mode of operation. In this mode, the transmission 120 receives mechanical power from one or possibly both of the engine shafts 26, 27, and the transmission 120 transmits some or all of this power to the cabin blower compressor 110. The cabin blower compressor 110, driven by the power from the engine shaft(s) 26, 27, compresses the air it receives from the air offtake and delivers it to the cabin of the aircraft 50.

It may be undesirable for the operating speed and power of the cabin blower compressor 110 to be dictated by the instantaneous operating point of the engine 10. To this end, one or both of the electric machines 131, 132 can be controlled to operate as either a motor or a generator to add power to or subtract power from that received from the engine shaft(s) 26, 27. Surplus generated electrical power may be used to charge the energy storage system 134 and/or to provide power to electrical loads via the output 140. Exemplary electrical loads include aircraft heating and lighting, cabin entertainment systems, wing and/or nacelle electric anti-icing systems, electric fuel pumps, electric oil pumps and others. If speed and/or power must be added to the cabin blower compressor, the required power may be delivered from the energy storage system 134.

Once the aircraft 50 has landed and taxied, and the engine 10 shut down, there will be no or little airflow through the core gas turbine. Consequently, as explained above, thermal asymmetry will begin to develop in the core and this can lead to bowing of the engine shafts, drums and casings. Thus, after engine shutdown, the system 100 is operated in a rotor bow mitigation mode of operation. In this mode, the transmission 120 will receive no mechanical power from the shafts 26, 27 of the engine, because the engine 10 is shutdown. Instead, the system 100 is controlled so that one or both of the electric machines 131, 132 receive electrical power from the energy storage system 134 and operates in a motor mode to drive the cabin blower compressor 110.

The cabin blower compressor 110, driven by one or both of the electric machines 131, 132, sucks air through the gas path of the core gas turbine engine. Alternatively, if the compressor 110 is driven in the reverse direction by the electric machines 131, 132, the compressor 110 may blow air through the gas path. In either case, the flow of air that is provided through the core engine in this mode of operation removes heat from the core, which reduces the extent to which thermal asymmetry can develop in the core.

In addition to providing a flow of air through the gas path to remove heat, when operating in the rotor bow mitigation mode the system 100 may drive rotation of one or both of the engine shafts 26, 27 to further prevent thermal asymmetry developing. Specifically, the transmission 120, receiving mechanical input from one or both of the electric machines 131, 132, may drive rotation of both the cabin blower compressor 110 and the shaft(s) 26, 27 that are in mechanical communication with the transmission 120. In other embodiments, however, the shaft(s) 26, 27 are selectively disconnected from the transmission 120 so that the electric machine(s) 131, 132 only drive the cabin blower compressor 110 in the rotor bow mitigation mode.

If the system 100 does drive rotation of the spool(s) during rotor bow mitigation mode, the speed of rotation of the spools will be significantly less than the speed of rotation during normal operation (e.g., idle, cruise, take-off, climb etc.) The speed of rotation may, for example, be less than 1,500 rpm, less than 1,000 rpm, less than 500 rpm or even less than 100 rpm.

The system 100, for example its mode of operation, is controlled by a controller. In the present embodiment the controller takes the form of the power management system 133, which through suitable control logic and power electronics controls the mode of operation of the electric machines 131, 132 (i.e., motor or generator mode) as well as their operating parameters (e.g., power, speed) and the operation of the energy storage system 134. It will however be appreciated that the power management system 133 may itself be under the control of another control system, for example a higher level controller such as FADEC (Full Authority Digital Engine Controller), the general configuration of which will be familiar to those skilled in the art. Any suitable control system is within the scope of the present invention.

FIG. 6

Figure 6:
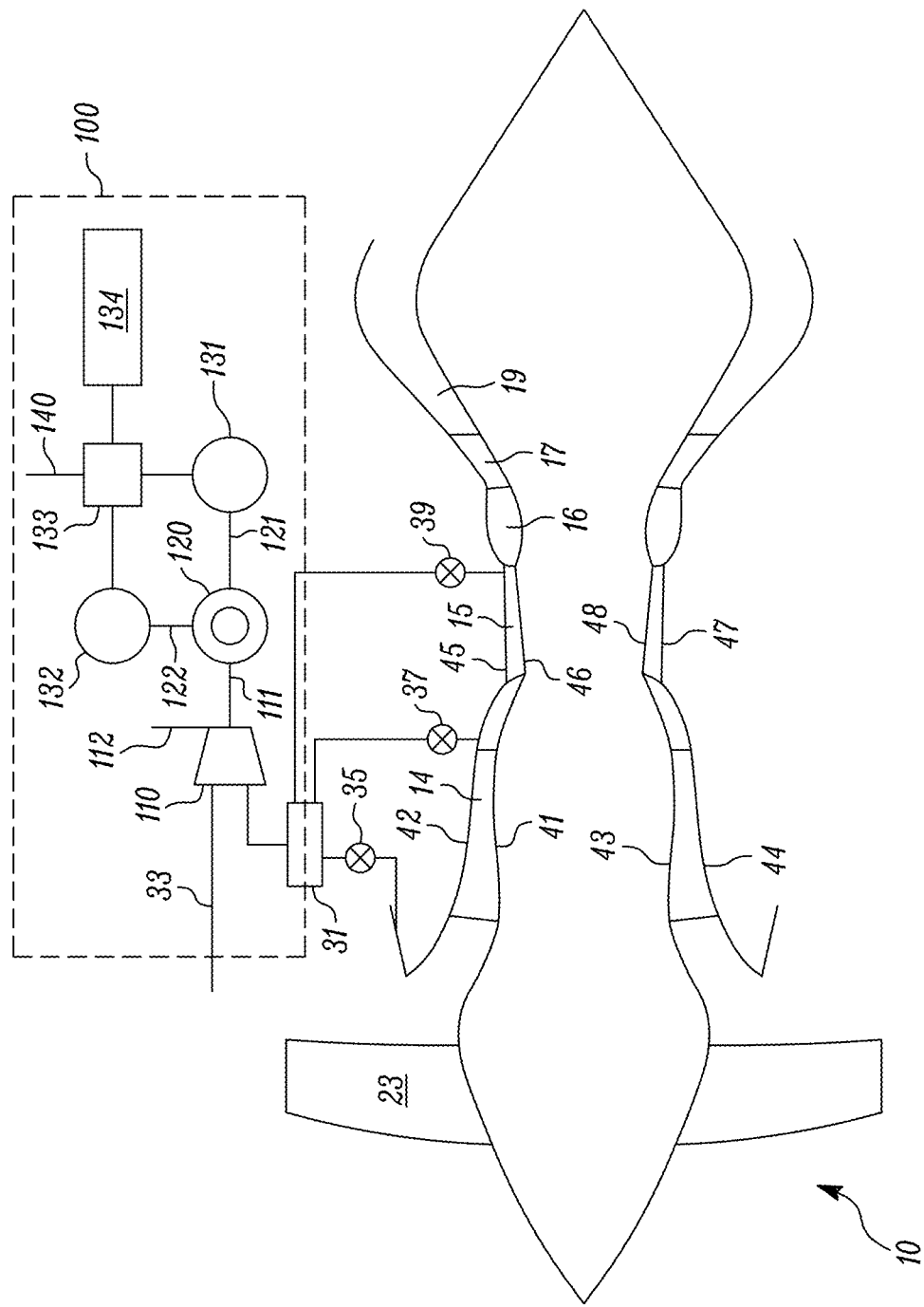
FIG. 6 is a sectional side view of a gas turbine engine, further showing the cabin blower system.

FIG. 6 illustrates the gas turbine engine 10 and cabin blower system 100 of FIG. 5, with some additional detail.

As mentioned previously, in the cabin blower mode of operation the cabin blower compressor 110 receives a flow of air from a manifold, labelled 31 in FIG. 6. The blower 110 compresses the air received through the manifold 31 and provides an output flow 112 to the cabin of the aircraft 50. The source of the air received through the manifold 31 can be selected as desired according to the application requirements. For example, the blower air feed may be one or more of ram air 33, fan delivery air (illustrated by the line including the control valve 35), inter-stage (e.g., inter-compressor) bleed air (illustrated by the line including the control valve 37) or high pressure compressor exit bleed air (illustrated by the line including the control valve 39). Other appropriate sources of air for the cabin blower 110 will occur to those skilled in the art.

So that the cabin blower compressor 110 can suck or blow air through the gas path in the rotor bow mitigation mode of operation, the blower compressor 110 is in fluid communication with the gas path in the rotor bow mitigation mode. It will be understood that where the source of the air received through the manifold 31 in the blower mode is the core gas path, the blower compressor 110 will also be in fluid communication with the gas path in the rotor bow mitigation mode. In this case, the system 100 may not require any reconfiguration. For example, if the blower compressor 110 receives high pressure compressor exit bleed air during normal operation of the cabin blower, no reconfiguration is necessary for the rotor bow mitigation mode. However, if the blower compressor 110 normally receives e.g., ram air 33, which may not be in the gas path, reconfiguration may be required. For example, one or both of the valves 37, 39 may be normally closed in the blower mode of operation, but opened in the rotor bow mitigation mode.

Where air to be blown through the gas path the compressor 110, rotating in the reverse direction, may suck air from the environment (e.g., through the ram air access 33 or with outlet 112 now acting as an air inlet) and blow it through the gas path (e.g., through the high pressure compressor bleed port via open valve 39). Generally speaking, sucking through the core may be preferable to blowing air through the core due to the possibility of air sucked from the ambient environment containing dust and other particulates.

In the blower mode, the compressed air is delivered to the cabin of the aircraft 50. In the rotor bow mitigation mode, air that is sucked through the gas path may also be delivered to the cabin of the aircraft 50. Alternatively, if it is not desirable to deliver this air into the cabin, the air may be discharged to the environment, for example by closing a valve to prevent flow to the cabin and opening a valve to deliver air through to the environment (e.g., through the ram air access 33).

Also illustrated in FIG. 6 are upper portions 41, 46 of the low and high pressure compressor drums; lower portions 43, 48 of the low and high pressure compressor drums; upper portions 42, 45 of the low and high pressure compressor casings; and lower portions 44, 47 of the low and high pressure compressor casings. As explained previously, following engine shutdown, the upper portions of the drums and casings 41, 42, 45, 46 will become hotter than the corresponding lower portions 43, 44, 47, 48 due to hot air rising in the core. The rotor bow mitigation mode of the cabin blower system 100, described above, helps clear this hot air and prevent a temperature difference arising.

FIG. 7

Figure 7:
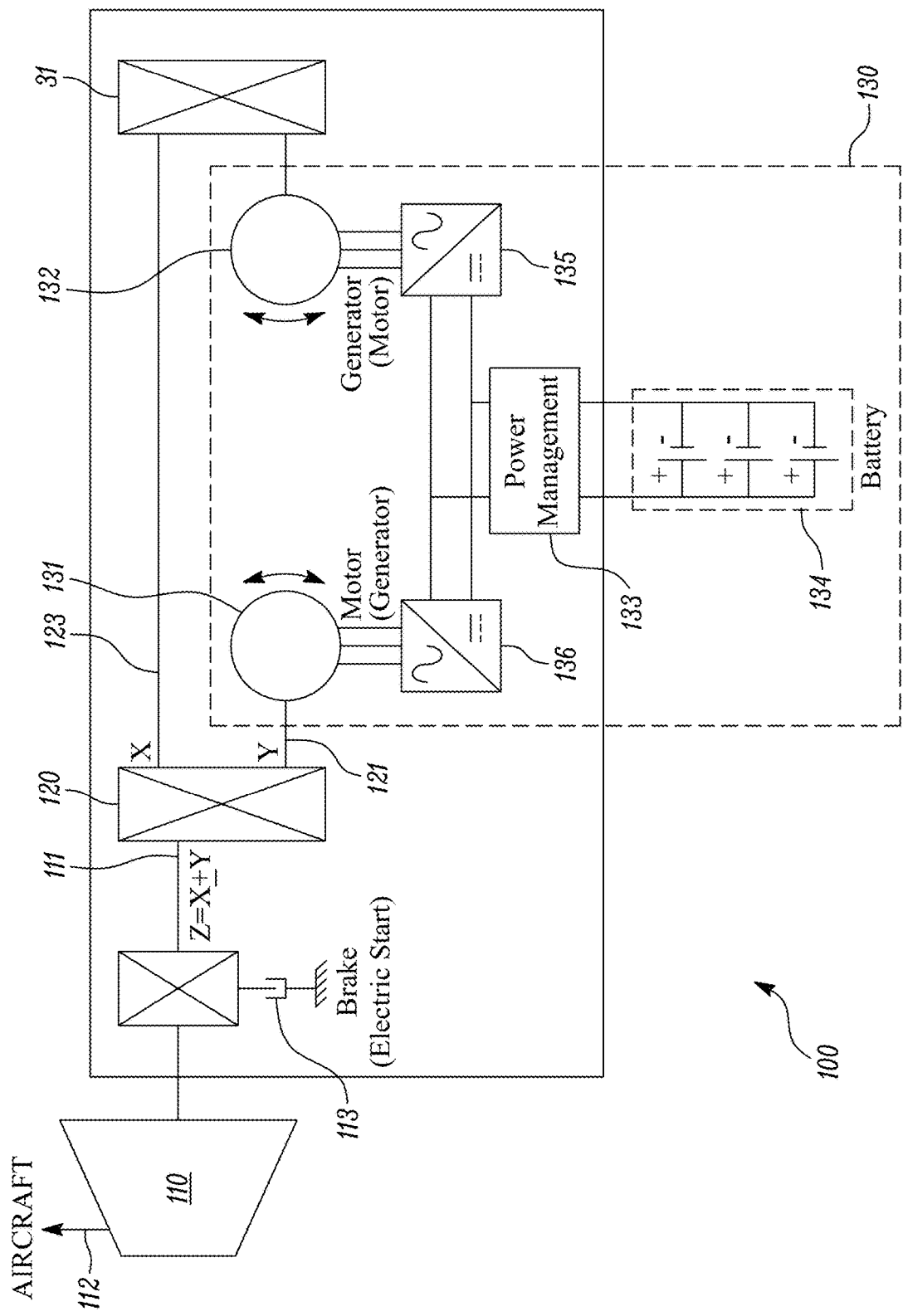
FIG. 7 is a schematic diagram of an embodiment of the cabin blower system.

FIG. 7 illustrates another exemplary arrangement of a cabin blower system 100 which may be used to implement embodiments described herein.

The cabin blower system 100 of FIG. 7 includes a cabin blower compressor 110, which is driven by a transmission 120 via a transmission output 111. The transmission 120 has two transmission inputs 121, 123, and may be a differential or epicyclic summing gearbox or the like.

One of the two transmission inputs 123 is received from a spool of the gas turbine engine 10, in this case via an auxiliary gearbox 31 which is mechanically coupled to a spool of the engine in a conventional manner. The spool may, for example, be a high pressure spool of a two- or three-spool engine, an intermediate pressure spool of a three-spool engine or a low pressure spool of a two-spool engine.

The other of the two transmission inputs 121 is received from a reversible electric variator 130, which may also be referred to as reversible continuously variable electric drive. The electric variator 130 includes two electric machines: a first electric machine 131, whose mechanical output is received by the transmission 120 as the input 121; and a second electric machine 132 which is mechanically connected to a spool of the gas turbine engine via the auxiliary gearbox 31. The two electric machines 131, 132 are electrically connected by power electronics, which is shown to include back-to-back AC-DC and DC-AC converters 135, 136. The modes of operation and operating parameters of the machines 131, 132 and power electronics 135, 136 can be controlled by a power management system 133. The variator 130 further includes an energy storage system 134, which can discharge to or charge from the electric machines 131, 132.

In this embodiment, the speed (Z) of the output 111 which drives the cabin blower compressor 110 will be equal to X±Y, where X is the contribution from the transmission input 123 from the shaft of the gas turbine engine, and Y is the contribution from the transmission input 121 from the first electric machine 131. The contribution Y is positive where the electric machine 131 is controlled to rotate in a forward direction, and negative where the electric machine 131 is controlled to rotate in a reverse direction opposite the forward direction. In this way, the speed of the blower compressor can add to or subtract from the speed provided by the spool of the engine 10 as required.

In the cabin blower mode of operation described above, the cabin blower compressor 110 is driven to rotate by mechanical power from the engine 10 via the transmission input 123. The speed and power at which it is driven to rotate may or may not be modified by the variator 130 (i.e., the speed Z may be equal to X or X±Y).

In the rotor bow mitigation mode of operation described above, the engine is shut down and so the engine's contribution (X) to the speed (Z) of the compressor 110 is zero. The compressor 110 is instead driven to rotate by the first electric machine 131 at a speed of ±Y, using electrical power from the energy storage system 134. The second electric machine 132 may additionally drive rotation of the spool of the gas turbine engine, by operating in a motor mode and driving the spool via the auxiliary gearbox 31.

FIG. 7 also illustrates a brake 113 located on the output shaft 111 between the transmission 120 and cabin blower compressor 110. The brake 113 may be used during an process of electrically starting the engine using the cabin blower system 100. For example, the brake 113 may be applied and both the first and second electric machines 131, 132 operated in motor mode to drive the spool(s) of the engine 10 via the auxiliary gearbox.

FIG. 8

Figure 8:
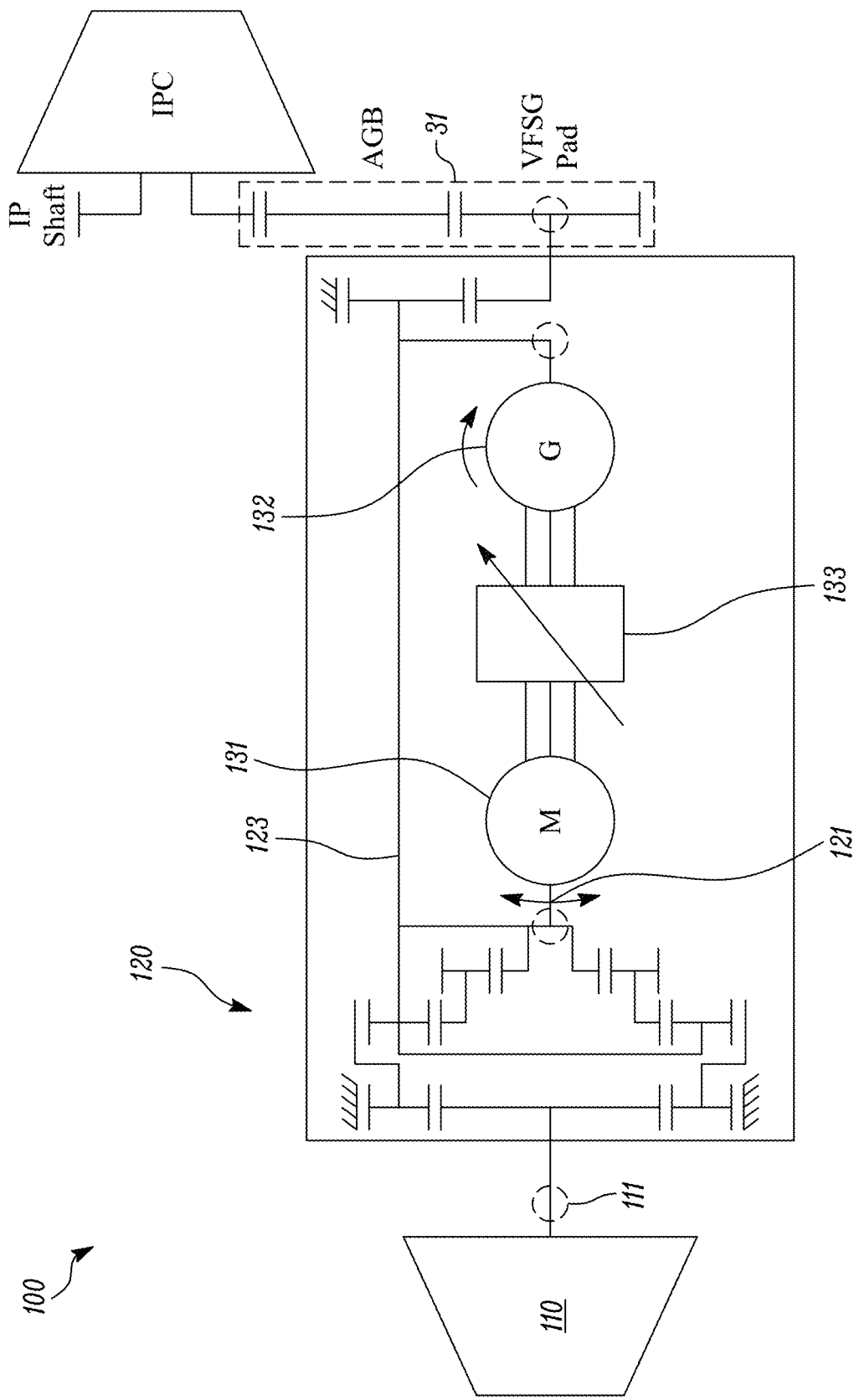
FIG. 8 is a schematic diagram of an embodiment of the cabin blower system of FIG. 7, illustrating its connection to an IP spool of a gas turbine engine.

FIG. 8 illustrates an embodiment of the arrangement of FIG. 7, in which the cabin blower system 100 receives mechanical power from an intermediate pressure shaft of a gas turbine engine, via an auxiliary gearbox 31. An exemplary arrangement of the transmission 120, which in this case is a summing epicyclic gearbox 120 is shown in FIG. 8. Although no brake 113, power electronics 135, 136 or energy storage system 134 are illustrated in FIG. 8, it will be understood these can be provided.

The arrangement of FIG. 8 is described in more detail in European Patent Publication EP 3517436 B1, the entire contents of which are incorporated herein by reference.

FIG. 9

Figure 9:
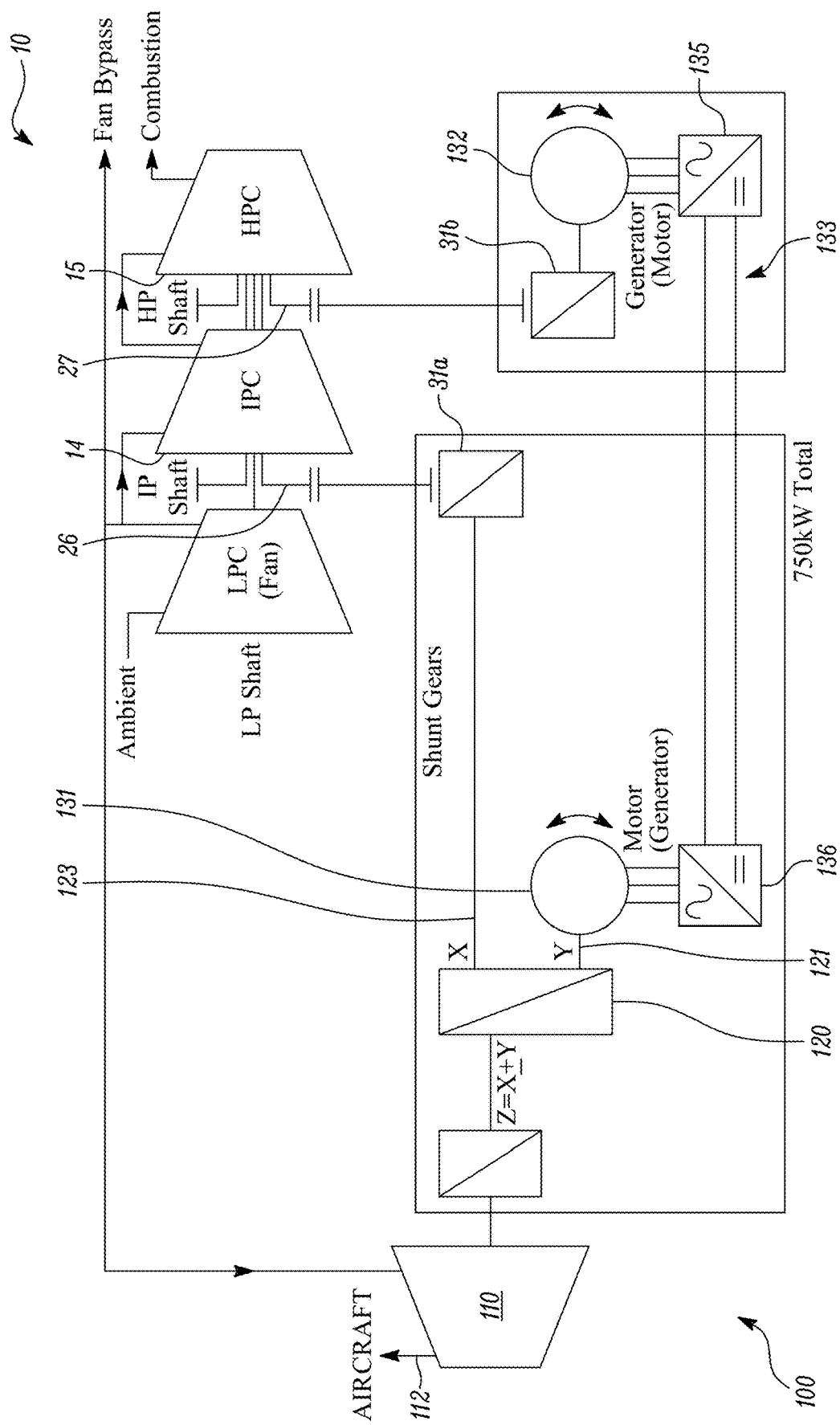
FIG. 9 is a schematic diagram of an embodiment of the cabin blower system of FIG. 7, illustrating its connection to both an IP spool and HP spool of a gas turbine engine.

FIG. 9 illustrates another embodiment of the arrangement of FIG. 7, in which the cabin blower system 100 receives mechanical power from both a high pressure spool and a low pressure spool of a gas turbine engine 10. Specifically, the transmission 120 receives mechanical input from the intermediate pressure shaft 26 of the engine 10 via a first auxiliary gearbox 31a, and the second electric machine 132 receives mechanical power from the high pressure shaft 27 via a second auxiliary gearbox 31b. Again, although no brake 113 or energy storage system 134 are illustrated in FIG. 9, it will be understood these can be provided.

The arrangement of FIG. 9 is described in more detail in European Patent Publication EP 3517438 B1, the entire contents of which are incorporated herein by reference.

Specific embodiments of a cabin blower system 100 have been described, and various alternatives will occur to those skilled in the art. For example:

Each of described examples includes a transmission 120, but alternatives in which there is no transmission are contemplated. For example, an electric machine (e.g., electric machine 131) may directly drive the cabin blower compressor 110 using electrical power from (i) an electrical power generator (e.g., electric machine 132) coupled to one or more engine spools; and/or (ii) an energy storage system 134. Such an arrangement may have advantages in terms of reduced weight and complexity, but may not be suitable for all applications, for instance where there are certain system certification or fault tolerance requirements.

Each of the described examples includes two electric machines 131, 132, but alternatives with one electric machine or more than two electric machines are contemplated. For example, although an arrangement with a single electric machine 131 cannot simultaneously motor and generate electrical power, the presence of the energy storage system 134 would still allow both the cabin blower and rotor motor bow mitigation functions to be implemented.

FIG. 10

Figure 10:
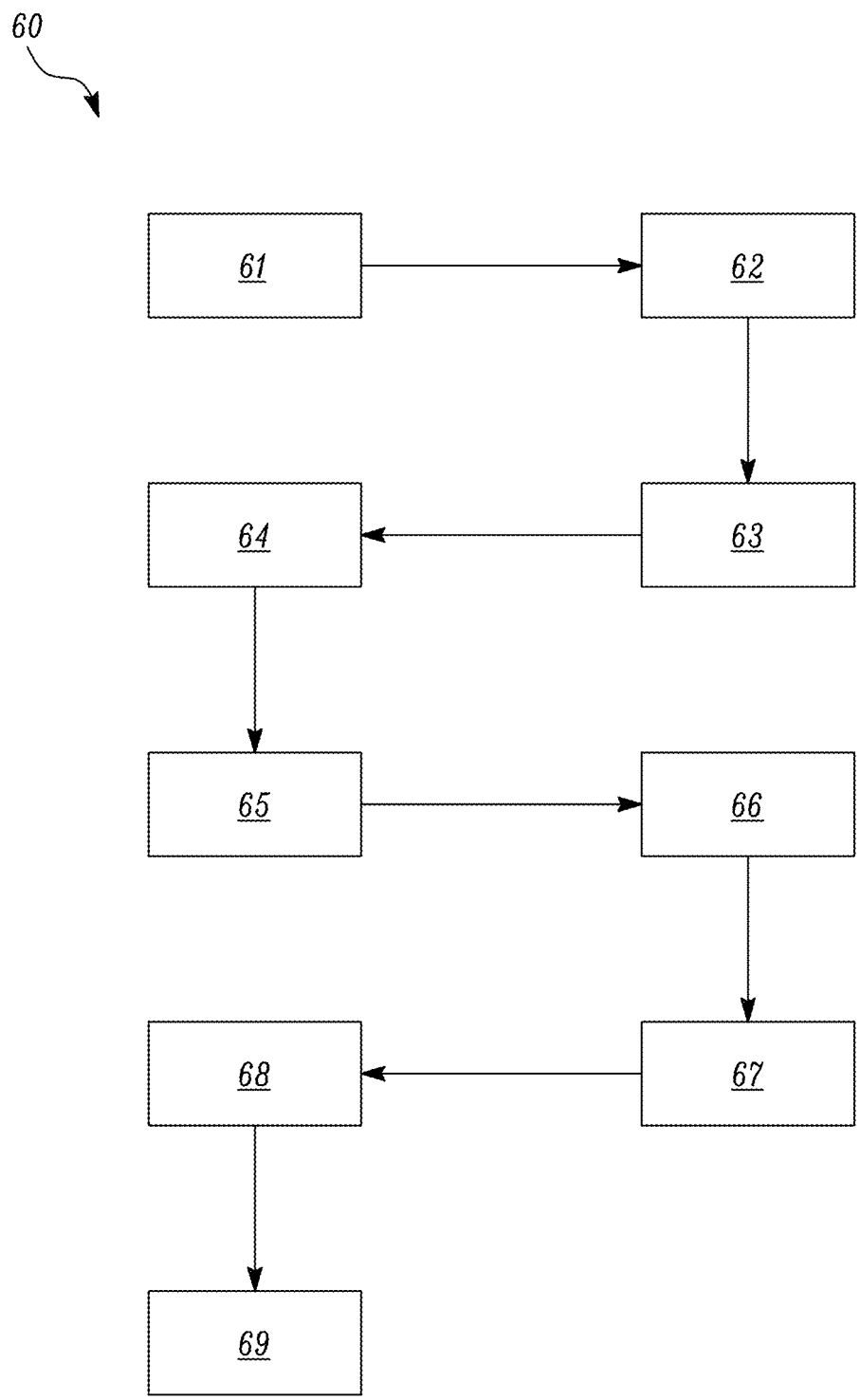
FIG. 10 is a flow chart illustrating a method of operating a cabin blower system of an aircraft.

FIG. 10 is a flow chart illustrating a method 60 of operating a cabin blower system 100 of an aircraft 50.

The method begins at 61, with the aircraft 50 in flight. The aircraft 50 may, for example be at cruise conditions (sometimes defined as 35,000 feet and Mach 0.85), or may be taking off or climbing.

At 62, during the flight, the cabin blower system 100 operates in the cabin blower mode of operation described above. In this mode of operation, the cabin blower compressor 110 is driven to provide a flow of air to a cabin of the aircraft, with some or all of the power that drives the cabin blower compressor 110 being extracted from one or more spools of the gas turbine 10 in a continuous, real-time manner. In other words, if power from the energy storage system 134 is utilized at all in the cabin blower mode, it only represents a fraction of the total power received by the cabin blower compressor 110.

At 63, the aircraft 50 begins to descend. For example, the aircraft 50 may be losing altitude in preparation to approach its destination. Consequently, the amount of thrust required by the aircraft may reduce, in which case the amount of fuel combusted by the combustors 16 of the engines 10 can be reduced. However, the amount by which the fuel consumption can be reduced may be limited by the fact the power demand of the cabin blower system 100 remains high, since the aircraft 50 is still at a relatively high altitude.

At 64, to improve fuel consumption during descent, the cabin blower system 100 may be operated in a hybrid descent mode. For example, a controller (e.g., a FADEC in communication with the power management system 133) may control the cabin blower system 100 so that the system 100 enters the hybrid descent mode.

In the hybrid descent mode, the cabin blower compressor 110 is driven by an electric machine 131 exclusively powered by electrical power from the energy storage system 134, and provides a flow of air to a cabin of the aircraft 50. In other words, the function—providing air to the cabin—is the same as in the cabin blower mode, but in the hybrid mode no mechanical power is extracted from the spools of the gas turbine engine for the purposes of driving the cabin blower compressor 110. This allows the engine 10 to be operated at lower fuel consumption since the power extracted from the engine spools to power other systems is reduced.

The hybrid mode may also be utilized during other flight stages, including take-off and cruise. During take-off, particularly on a hot day, the power required by the cabin blower system may be low. In this case, if the energy storage system 134 has sufficient charge, the hybrid mode may be engaged to reduce power off-take, which may improve turbine life. During cruise, if the energy storage system 134 has sufficient charge, the hybrid mode may be engaged to reduce the fuel consumption required to maintain cruise thrust.

At 65, the aircraft begins to land. During the landing process, it is desirable to reduce the thrust produced by the engines 10 and, to this end, remove mechanical power from the engine shafts 26, 27.

Furthermore, at this stage of the flight cycle, the energy storage system 134 of the cabin blower system 100 may be partially or completed discharged, for example if it was used during the hybrid descent mode of step 64. This may be a problem if the system 100 is to be operated in the rotor bow mitigation mode after engine shutdown (see steps 68-69 below), as this mode relies on the energy storage system 134. It will however be understood that this may not be a problem, for example if hybrid descent mode was not utilized, or if a ground source of energy (e.g., a ground cart) can be used to replace or charge the energy storage system 134 for the rotor bow mitigation mode.

At 66, to remove mechanical power from the spools and to charge the energy storage system 134, the cabin blower system 100 may be operated in a charging mode. For example, a controller (e.g., a FADEC in communication with the power management system 133) may control the cabin blower system 100 so that the system 100 enters the charging mode. The system 100 may enter this mode in response to the controller making a determination to the effect that the aircraft 50 is landing, for example if a reverse thrust mechanism is activated, or the aircraft has descended below an altitude threshold (e.g., about 5,000 feet) or is taxiing following landing.

In the charging mode, one or more electric machines (e.g., electric machine 131 and/or electric machine 132) operate as generators to extract mechanical power from one or more spools of the engine 10, generate electrical power therefrom, and to use some or all of the electrical power to charge the energy storage system 134.

In this mode of operation the cabin blower compressor 110 may be driven to rotate by one or more of the spools (e.g., via transmission input 26r, 27r, 123), by one of the electric machines (e.g., by machine 131, with machine 132 operating as the generator) or by a combination of the two. In other embodiments, the blower compressor 110 may not be driven at all during the charging mode. For example, both electric machines 131, 132 may be operated as generators, and the blower compressor 110 may be disconnected from the engine shaft(s) by activating a disconnect arrangement.

At 67, the aircraft has landed and taxis to a suitable location whereupon its engines 10 are shutdown. Consequently, with no (or very limited) airflow through the core engines and no rotation of the spools, thermal asymmetry may begin to develop within the engine core.

At 68, to remove heat from the engine core, the cabin blower system 100 may be operated in the rotor bow mitigation mode of operation. For example, a controller (e.g., a FADEC in communication with the power management system 133) may control the cabin blower system 100 so that the system 100 enters the rotor bow mitigation mode. The system 100 may enter this mode in response to the controller making a determination to the effect that the engine 10 has shutdown.

As described previously, in the rotor bow mitigation mode, the cabin blower compressor 110 is driven by one or more electric machines (e.g., electric machine 131 and/or electric machine 132) which are powered exclusively using electrical power from the energy storage system 134. The rotation of the compressor 110 in this mode provides a flow of air (by sucking or blowing air) through the gas path of the core gas turbine engine to remove heat therefrom. As described with reference to FIG. 6, the blower 110 will be in fluid communication with the core gas path, either because it was already in fluid communication with the gas path through the cabin blower mode, or through reconfiguration of the system to provide fluid communication (e.g., the opening and closing of suitable combinations of valves 35, 37, 39).

At 69, to further prevent thermal asymmetry in the engine core, the cabin blower system 100 may drive the rotation of one or more of the engine spools. For example, one of the electric machines (e.g., electric machine 131) may drive the cabin blower compressor 110 whilst another electric machine (e.g., electric machine 132) may drive one or more spools (e.g., via an accessory gearbox 31). The speed of rotation of the spools in this mode of operation may be relatively low, for example less than 10% of the nominal rated speed of the spools, for example between 1% and 9%, between 2% and 8%, preferably between about 3% and 7% (e.g., about 5%). The term "nominal rated speed" will be understood to refer the maximum speed at which a spool is rated to rotate in a sustained manner and without damaging the engine. The nominal rated speed of the HP spool may be about 25,000 rpm (e.g., 20,000-30,000 rpm) and the nominal rated speed of the LP (or IP) spool may be about 10,000 rpm (e.g., 7,500-12,500 rpm).

In some embodiments, step 69 may comprise intermittently driving the engine spool(s), for example pulsing the driving electric machine(s) every few minutes. Pulsed driving of the spool(s) may follow a period of continuous driving of the spool(s) after engine shutdown. The period of continuous driving of the spools may be, for example, 10 minutes (e.g., between 5 and 20 minutes).

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A gas turbine engine for an aircraft, the gas turbine engine comprising:
a cabin blower and rotor bow mitigation system, the cabin blower and rotor bow mitigation system comprising:
a cabin blower compressor mechanically coupled to one or more spools of the gas turbine engine;
an electric machine mechanically coupled to the cabin blower compressor; and
a controller configured to control the cabin blower and rotor bow mitigation system so that:
in a cabin blower mode of operation, rotation of the cabin blower compressor is mechanically driven by the one or more spools, wherein the rotation of the cabin blower compressor in the cabin blower mode compresses air received through a manifold and provides a compressed output flow of air for delivery to a cabin of the aircraft;
in a rotor bow mitigation mode of operation, rotation of the cabin blower compressor is driven by the electric machine using electrical power from an electrical power source, wherein the rotation of the cabin blower compressor in the rotor bow mitigation mode sucks or blows a flow of air through a core of the gas turbine engine to remove heat from the core.

2. The gas turbine engine of claim 1, in which the controller is further configured to control the cabin blower and rotor bow mitigation system so that:
in the rotor bow mitigation mode of operation, the electric machine and/or an additional electric machine of the cabin blower and rotor bow mitigation system drives rotation of one or more spools of the gas turbine engine.

3. The gas turbine engine of claim 1, in which the controller is configured to operate the cabin blower and rotor bow mitigation system in the rotor bow mitigation mode in response to making a determination the gas turbine engine has shut down.

4. The gas turbine engine of claim 1, in which the controller is further configured to control the cabin blower and rotor bow mitigation system so that:
in a hybrid flight mode of operation, the cabin blower compressor is driven by the electric machine using electrical power from the electrical power source and provides the compressed output flow of air to the cabin of the aircraft.

5. The gas turbine engine of claim 4, in which the controller is configured to operate the cabin blower and rotor bow mitigation system in the hybrid flight mode in response to making a determination the aircraft is descending.

6. The gas turbine engine of claim 1, in which the electrical power source comprises an energy storage system.

7. The gas turbine engine of claim 6, in which the controller is further configured to control the cabin blower and rotor bow mitigation system so that:
in a charging mode of operation, the energy storage system is charged using electrical power generated by the electric machine and/or an additional electric machine using mechanical power extracted from the one or more spools of the gas turbine engine.

8. The gas turbine engine of claim 7, in which the controller is configured to operate the cabin blower and rotor bow mitigation system in the charging mode in response to making a determination the aircraft is landing.

9. The gas turbine engine of claim 1, in which the electric machine is a first electric machine and the cabin blower and rotor bow mitigation system further comprises:
a second electric machine arranged to receive mechanical power from the one or more spools of the gas turbine engine; and
the controller comprises: a power management system electrically connected to the first electric machine and the second electric machine.

10. The gas turbine engine of claim 9, wherein the electrical power source is electrically connected to the power management system, whereby the first electric machine and/or second electric machine can receive electric power from the electrical power source via the power management system.

11. The gas turbine engine of claim 1, wherein the cabin blower compressor is arranged in fluid communication with a gas path of the gas turbine engine.

12. The gas turbine engine of claim 1, wherein:
in the cabin blower mode, ram air or fan delivery air is supplied to the cabin blower compressor, and
in the rotor bow mitigation mode, one or more valves are opened or closed to fluidly connect the cabin blower compressor to a gas path of the core.

13. The gas turbine engine of claim 12, being of geared turbofan type.

14. An aircraft comprising the gas turbine engine of claim 1.

15. A method of operating a cabin blower and rotor bow mitigation system of a gas turbine engine of an aircraft,
the gas turbine engine comprising the cabin blower and rotor bow mitigation system,
the cabin blower and rotor bow mitigation system comprising:
a cabin blower compressor mechanically coupled to one or more spools of the gas turbine engine;
an electric machine mechanically coupled to the cabin blower compressor; and
a controller configured to control the cabin blower and rotor bow mitigation system so that:
in a cabin blower mode of operation, rotation of the cabin blower compressor is mechanically driven by the one or more spools, wherein the rotation of the cabin blower compressor in the cabin blower mode compresses air received through a manifold and provides a compressed output flow of air for delivery to a cabin of the aircraft;
in a rotor bow mitigation mode of operation, rotation of the cabin blower compressor is driven by the electric machine using electrical power from an electrical power source, wherein the rotation of the cabin blower compressor in the rotor bow mitigation mode sucks or blows a flow of air through a core of the gas turbine engine to remove heat from the core;
the method comprising:
during flight of the aircraft, using power extracted from the one or more spools of the gas turbine engine of the aircraft, driving the cabin blower compressor to provide the compressed output flow of air to the cabin of the aircraft; and
after shutting down the engine, using the electric machine powered by the electrical power from the electrical power source, driving the cabin blower compressor to provide the flow of air through the core of the gas turbine engine to remove heat from the core.

16. The method of claim 15, further comprising:
after shutting down the engine, using the electric machine and/or an additional electric machine powered by the electrical power from the electrical power source, driving rotation of the one or more spools of the gas turbine engine.

17. The method of claim 16, in which the electric machine and/or the additional electric machine drives the rotation of the one or more spools at a speed of less than 1,500 rpm.

18. The method of claim 15, further comprising:
during a descent phase of the flight of the aircraft, using the electric machine powered by the electrical power from the electrical power source, driving the cabin blower compressor to provide the compressed output flow of air to the cabin of the aircraft.

19. The method of claim 15, wherein the electrical power source comprises an energy storage system and the method further comprises, during a landing phase of the flight of the aircraft:
extracting, by the electric machine and/or an additional electric machine, mechanical power from a spool of the one or more spools of the gas turbine engine and generating electrical power therefrom; and
charging the energy storage system using the generated electrical power.

\* \* \* \* \*